Jan. 2, 1968     L. L. HARRISON     3,361,256
HIGH SPEED SORTING CONVEYOR STRUCTURE
Filed Jan. 20, 1966     2 Sheets-Sheet 1

INVENTOR.
LAWRENCE L. HARRISON.
BY
D. Emmett Thompson
ATTORNEY.

Jan. 2, 1968  L. L. HARRISON  3,361,256
HIGH SPEED SORTING CONVEYOR STRUCTURE
Filed Jan. 20, 1966  2 Sheets-Sheet 2
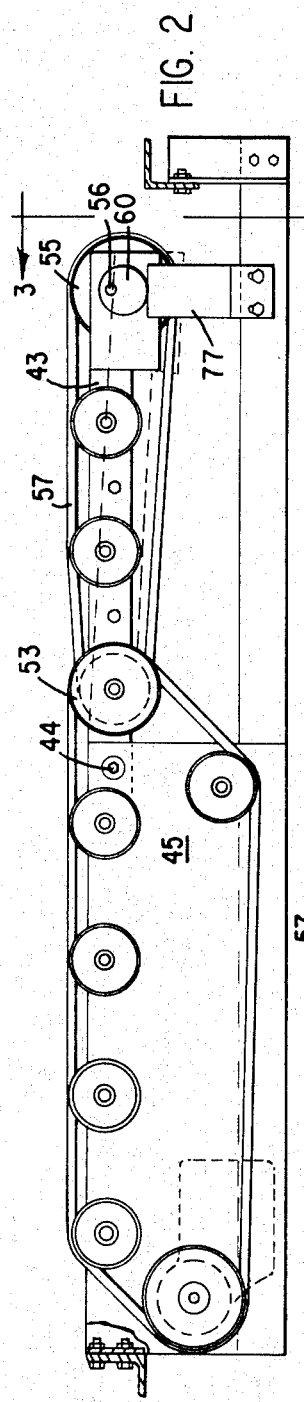
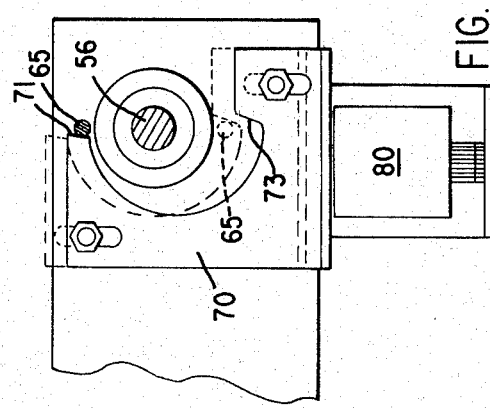
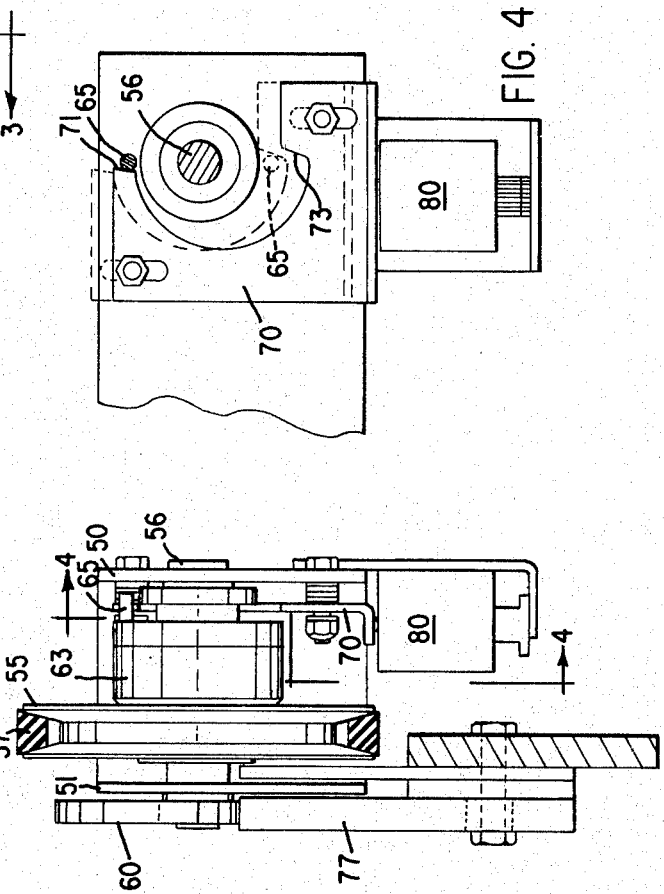
INVENTOR.
LAWRENCE L. HARRISON.
BY
*D. Emmett Thompson*
ATTORNEY.

3,361,256
HIGH SPEED SORTING CONVEYOR STRUCTURE
Lawrence Lyle Harrison, Manlius, N.Y., assignor, by mesne assignments, to Diebold, Incorporated, Canton, Ohio, a corporation of Ohio
Filed Jan. 20, 1966, Ser. No. 521,891
4 Claims. (Cl. 209—74)

This invention relates to high-speed sorting conveyors of the type wherein a branch conveyor extends laterally from a main conveyor, the structure including a transfer mechanism for transferring a coded article advancing on the main conveyor to the branch conveyor. One form of such transfer mechanism consists of an endless transfer belt trained over spaced apart sheaves mounted in a structure which may be elevated to raise the upper run of the belt above the load bearing surface of the main conveyor for engagement with an article thereon. The belt is power-driven in a direction so the upper run of the belt moves the engaged article from the main conveyor onto the branch conveyor.

In such arrangements, a form of prime mover is employed for raising the sheaves and transfer belt, the prime mover being actuated by a conventional code sensing means located a short distance upstream from the joinder of the branch conveyor with the main conveyor.

This invention has as an object a conveyor transfer mechanism of the general type referred to incorporating a cam powered by one of the rotating belt sheaves for raising the upper run of the transfer belt, avoiding the necessity of employing a separate prime mover for raising and lowering the transfer mechanism.

The invention consists in the novel features and in the combinations and constructions hereinafter set forth and claimed.

In describing this invention, reference is made to the accompanying drawings in which like characters designate corresponding parts in all the views.

In the drawings:

FIGURE 2 is a sectional view taken on line 2—2, FIGURE 1.

FIGURE 3 is an end elevational view of the transfer mechanism showing one of the belt sheaves in cross section.

FIGURE 4 is a view taken on line 4—4, FIGURE 3.

Figure 1:
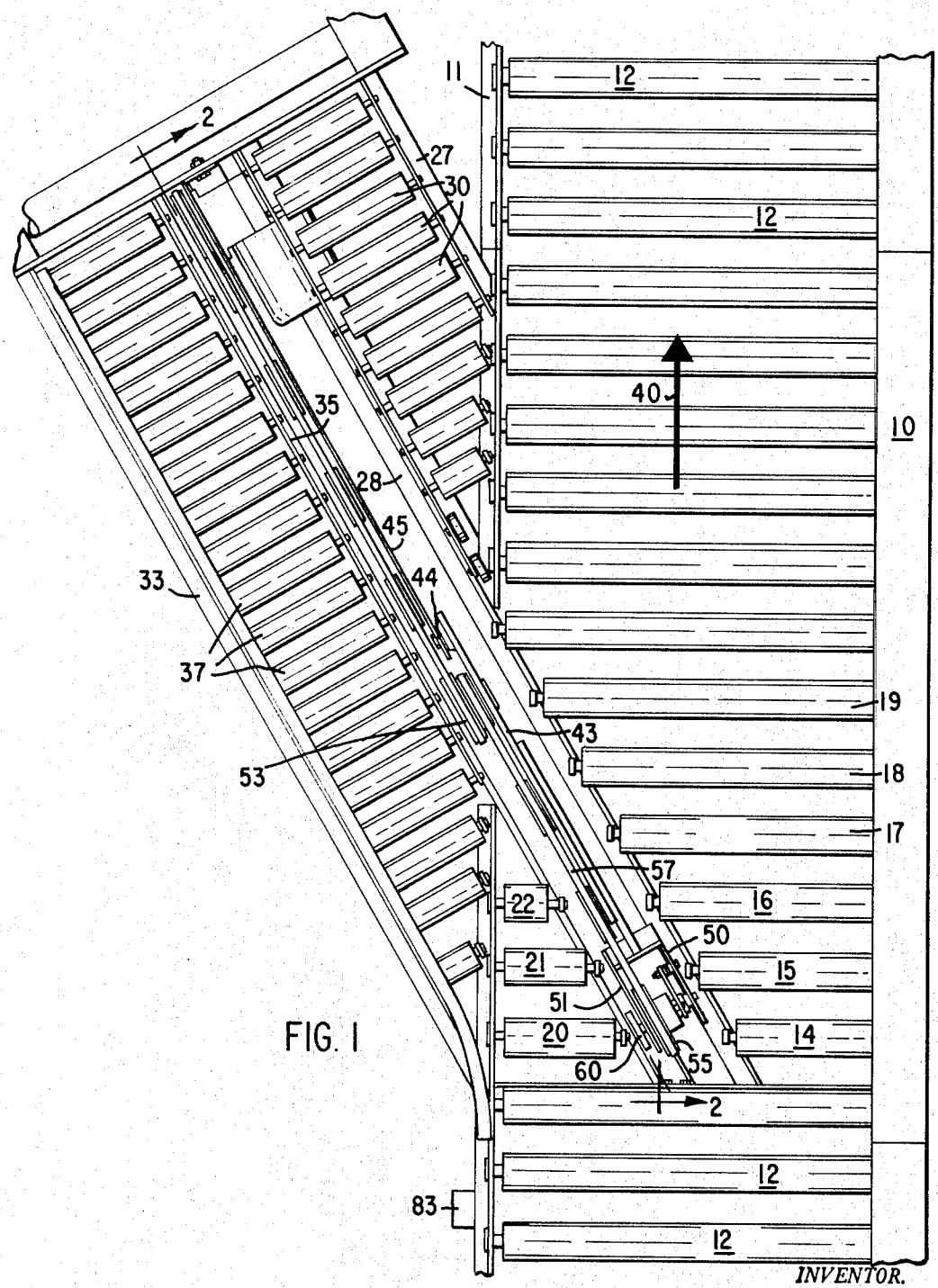
FIGURE 1 is a plan view of a conveyor structure embodying my invention.

The main conveyor consists of side members 10, 11, between which are journalled load bearing rolls 12, which are journalled at their ends in the side members 10, 11, and which usually are power-driven.

Certain of these load supporting rolls, as 14–22, are foreshortened to provide a diagonally extending opening in the main conveyor. That portion of the branch conveyor joining the main conveyor consists of a section having side members 27, 28, between which are journalled rolls 30, and a second section having side members 33, 35, between which are journalled load supporting rolls 37. These sections are spaced apart to provide a continuation of the diagonal space formed in the main conveyor. A linear procession of articles is advanced on the main conveyor in the direction of the arrow 40. The conveyor structure described is conventional in arrangements of this kind.

The transfer mechanism consists of an arm 43 pivotally mounted at one end on a pivot 44 carried by a supporting plate 45 fixedly mounted in the branch conveyor framework. The arm 43 extends from the pivot 44 through the diagonal opening into the main conveyor and is provided at its end opposite from the pivot with plates 50, 51, extending in parallel spaced apart relation. A double sheave 53 is journalled in the arm 43 in proximity to the pivot 44. A sheave 55 is rotatably mounted on a shaft 56 journalled in the plates 50, 51. An endless belt is trained about the sheaves 53, 55, with the upper run 57 of the belt normally positioned below the load bearing plane of the rolls 14–22.

A cam 60 is fixedly mounted to the shaft 56. A clutch 63 is mounted on the shaft 56 and serves to connect and disconnect the cam 60 to the sheave 55. The clutch 63 is of the stop and pin controlled type. That is, the clutch is provided with an actuating pin 65 which, upon engagement with a fixed stop, effects disengagement of the clutch. Such clutches are conventionally operated as a one revolution clutch, there being one stop provided which, when moved out of engagement with the actuating pin, effects engagement of the clutch and, if the stop is re-positioned during a revolution of the clutch, the stop is engaged by the actuating pin and the clutch is disengaged.

In the arrangement herein shown and described, there is provided a trip plate 70 provided with a pair of stops 71 and 73. As disclosed, the cam 60 is of symmetrical eccentric configuration, although it will be apparent it could be of any configuration providing a suitable lobe. When the actuating pin 65 is in engagement with the trip stop 71, as shown in FIGURE 4, the lower surface of the cam 60 is in engagement with a fixed member 77. When the trip plate 70 is moved upwardly from normal position to move the stop 71 out of engagement with pin 65, the clutch will engage and rotate. When the lobe, or high point, of the cam is in engagement with the fixed member 77, the pin 65 engages the now elevated stop 73 of the trip plate effecting disengagement of the clutch.

This operation has effected elevation of the arm 43 to position the upper run 57 of the transfer belt slightly above the plane of the load bearing rolls of the main conveyor. Accordingly, if there is an article present on the main conveyor, it will be engaged by the belt and transferred to the branch conveyor.

The trip plate 70 is connected to an actuator shown as a solenoid 80. When the solenoid is energized, the trip plate 70 is moved upwardly from the full line position, FIGURE 4, to the dotted outline position. As previously explained, this results in moving the stop 71 out of registration with the clutch pin 65, permitting the clutch to engage and effect rotation of the shaft 56 and cam 60. When the shaft and cam have rotated a part of a revolution, the stop pin 65 engages the now upwardly positioned stop 73, at which time the high point of the cam has, by engagement with the fixed member 77, effected elevation of the transfer arm. The solenoid 80 may be energized by a manually operable switch to effect transfer of an article from the main conveyor, or a series of articles. When the solenoid 80 is deenergized, the trip plate 70 will move downwardly, this downward movement being effected by the weight of the plate and the plunger solenoid and is aided by the inclined stop surface 73, see FIGURE 4. The stop surface 73 is inclined upwardly and in a direction comparable to the movement of the stop pin 65 which, in FIGURE 4, is in counter-clockwise direction.

A sensing device 83 may be positioned contiguous to the main conveyor upstream from the joinder of the branch conveyor, see FIGURE 1. The sensing device 83 is of conventional form and functions to energize the solenoid 80 upon the approach of an article on the main conveyor having a preselected destination code. These sensing devices may transmit a pulse to the solenoid 80 upon the passage of an article bearing a predetermined code destination, or the sensing device can be procured so that it will function to maintain the solenoid 80 energized until a subsequent article approaches on the main conveyor, which article does not carry the predetermined code destination.

It will be apparent, upon deenergization of the solenoid 80 to move the stop surface 73 out of engagement with the clutch pin 65, the clutch will again engage and complete the remainder of the revolution, with the pin 65 engaging the stop 71 and this operation results in returning the transfer arm to down position, with the upper run 57 of the transfer belt extending below the load bearing plane of the main conveyor rolls.

What I claim is:

1. A high speed sorting conveyor structure including a main conveyor for advancing a linear procession of articles, and a branch conveyor extending laterally from one side of said conveyor at other than a right angle thereto, an article transfer mechanism for transferring an article from said main conveyor to said branch conveyor, said mechanism including an arm extending lengthwise of said branch conveyor intermediate the sides thereof, one end portion of said arm extending into said main conveyor and terminating intermediate the sides thereof, a first sheave journalled in said end of said arm, a second sheave journalled in said arm in spaced relation to said first sheave, an endless belt trained over said sheaves, said arm being normally positioned to locate the upper run of said belt below the load bearing plane of said main conveyor, said arm being movable vertically from normal position to up position to locate the upper run of said belt above the load bearing plane of said main conveyor for engagement with an article traveling on said main conveyor, power means connected to one of said sheaves to effect continuous rotation thereof for movement of the upper run of said belt in a direction toward said branch conveyor, a cam journalled in said end portion of said arm, a fixed member, said cam having a lobe engaging said fixed member upon a partial revolution of said cam for elevating said arm to up position and move the upper run of said belt above the load bearing plane of said main conveyor, a stop and pin controlled clutch for connecting and disconnecting said cam to the sheave in said end portion of said arm, said clutch having an actuating pin movable in a circular path when the clutch is engaged, a trip member having first and second clutch pin engaging stops, said trip member being normally positioned with said first stop engaging said clutch pin to maintain said clutch disengaged, an actuator operatively connected to said trip member and being operable when energized for actuating said trip member to move said first stop out of pin engaging position, and to move said second stop for engagement by said clutch pin when said cam lobe is in engagement with said fixed member.

2. A high speed sorting conveyor as set forth in claim 1 and including a code sensing means located in juxtaposition to said main conveyor upstream from the joinder thereof with said branch conveyor, and operable upon passage of an article bearing a predetermined code destination to energize said actuator during such partial revolution of said cam.

3. A high speed sorting conveyor structure as defined in claim 1, wherein said code sensing means is further operable upon advancement of a subsequent article on said main conveyor, not bearing said predetermined code destination, to deenergize said actuator.

4. A high speed sorting conveyor structure as defined in claim 2, wherein said actuator is an electrically operated solenoid.

References Cited

UNITED STATES PATENTS

| | | | |
|---|---|---|---|
| 3,018,873 | 1/1962 | Burt | 198—38 |
| 3,170,572 | 2/1965 | Harrison | 209—74 |
| 3,291,279 | 12/1966 | De Good | 198—31 X |

M. HENSON WOOD, JR., *Primary Examiner.*

R. A. SCHACHER, *Assistant Examiner.*